(12) United States Patent
Rogers

(10) Patent No.: US 11,367,908 B2
(45) Date of Patent: Jun. 21, 2022

(54) BATTERY MODULES, A BATTERY PACK, AND A METHOD FOR REPLACING THE BATTERY MODULES

(71) Applicant: TOYOTA MOTOR ENGINEERING & MANUFACTURING NORTH AMERICA, INC., Plano, TX (US)

(72) Inventor: Caleb M. Rogers, Lexington, KY (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 155 days.

(21) Appl. No.: 16/690,902

(22) Filed: Nov. 21, 2019

(65) Prior Publication Data

US 2021/0159554 A1    May 27, 2021

(51) Int. Cl.
*H02J 7/00* (2006.01)
*H02J 7/14* (2006.01)
(Continued)

(52) U.S. Cl.
CPC ........... *H01M 10/441* (2013.01); *B60L 50/64* (2019.02); *B60L 53/16* (2019.02); *B60L 53/80* (2019.02);
(Continued)

(58) Field of Classification Search
USPC ....................................................... 320/109
See application file for complete search history.

(56) References Cited

U.S. PATENT DOCUMENTS 6,184,656 B1 * 2/2001 Karunasiri .............. B60L 58/27
320/119
8,146,694 B2    4/2012 Hamidi
(Continued)

FOREIGN PATENT DOCUMENTS

FR          2705926 A1    12/1994

OTHER PUBLICATIONS

Plugs, socket-outlets, vehicle couplers and vehicle inlets—Conductive charging of electric vehicles—Part 1: Charging of electric vehicles up to 250 A a.c. and 400 A d.c., International Standard, IEC 62196-1, First edition , 2003, 78 pages.
(Continued)

*Primary Examiner* — Alexis B Pacheco
(74) *Attorney, Agent, or Firm* — Oblon, McClelland, Maier & Neustadt, L.L.P.

(57) ABSTRACT

Aspects of the disclosure provide a battery pack, battery modules, and a method for replacing the battery modules. The battery pack can include a first battery module and a second battery module. The first battery module can include a charging socket configured to charge the first battery module and the charging socket is conformed to a standard configuration. The charging socket can include first terminals for electrically coupling to the second battery module and a cooling interface connected to a conduit in the first battery module to cool the first battery module. The method can include electrically isolating the first battery module from a HV module interconnection system that connects the first and second battery modules in a vehicle. The method can include removing the first battery module from a compartment of the vehicle where the battery pack is positioned and installing another battery module into the compartment.

18 Claims, 16 Drawing Sheets

(51) Int. Cl.
*H01M 10/44* (2006.01)
*H01M 10/613* (2014.01)
*H01M 10/625* (2014.01)
*B60L 53/16* (2019.01)
*B60L 50/64* (2019.01)
*B60L 53/80* (2019.01)
*B60L 58/26* (2019.01)

(52) U.S. Cl.
CPC ....... *H01M 10/613* (2015.04); *H01M 10/625* (2015.04); *H02J 7/0013* (2013.01); *H02J 7/0045* (2013.01); *B60L 58/26* (2019.02)

(56) References Cited

U.S. PATENT DOCUMENTS

| | | | |
|---|---|---|---|
| 9,156,360 B2 | 10/2015 | Park et al. | |
| 10,266,066 B2 * | 4/2019 | Tsuji | B60L 50/66 |
| 10,355,254 B1 * | 7/2019 | Roddy | B60L 50/64 |
| 2003/0209375 A1 | 11/2003 | Suzuki et al. | |
| 2005/0269995 A1 * | 12/2005 | Donnelly | H01M 10/613 320/150 |
| 2008/0137290 A1 * | 6/2008 | Tanaka | H01M 10/613 361/690 |
| 2009/0058355 A1 | 3/2009 | Meyer | |
| 2009/0139781 A1 * | 6/2009 | Straubel | B60L 50/64 180/65.1 |
| 2009/0198372 A1 | 8/2009 | Hammerslag | |
| 2011/0025268 A1 | 2/2011 | Davidovitch | |
| 2014/0093766 A1 * | 4/2014 | Fees | H01M 10/049 429/120 |
| 2017/0005371 A1 * | 1/2017 | Chidester | B60L 15/20 |
| 2017/0232865 A1 * | 8/2017 | Christen | H01M 10/625 429/120 |
| 2017/0279169 A1 * | 9/2017 | Obrist | H01M 10/613 |
| 2017/0327091 A1 * | 11/2017 | Capizzo | B60S 5/02 |
| 2018/0026243 A1 * | 1/2018 | Stojanovic | H01M 50/20 429/99 |
| 2019/0016231 A1 * | 1/2019 | Scaringe | H01M 10/6554 |
| 2019/0283626 A1 * | 9/2019 | Staudenmaier | H01M 10/441 |
| 2020/0028223 A1 * | 1/2020 | Berge | H01M 10/658 |
| 2020/0164760 A1 * | 5/2020 | Sohmshetty | B64F 5/40 |
| 2020/0280197 A1 * | 9/2020 | Winger | B60L 53/00 |
| 2021/0057694 A1 * | 2/2021 | Zeiler | H01M 10/613 |

OTHER PUBLICATIONS

Plugs, socket-outlets, vehicle connectors and vehicle inlets—Conductive charging of electric vehicles—Part 3: Dimensional compatibility and interchangeability requirements for d.c. and a.c./d.c. pin and contact-tube vehicle couplers, International Standard, IEC 62196-3, Edition 1.0, 2014, 11 pages.

* cited by examiner

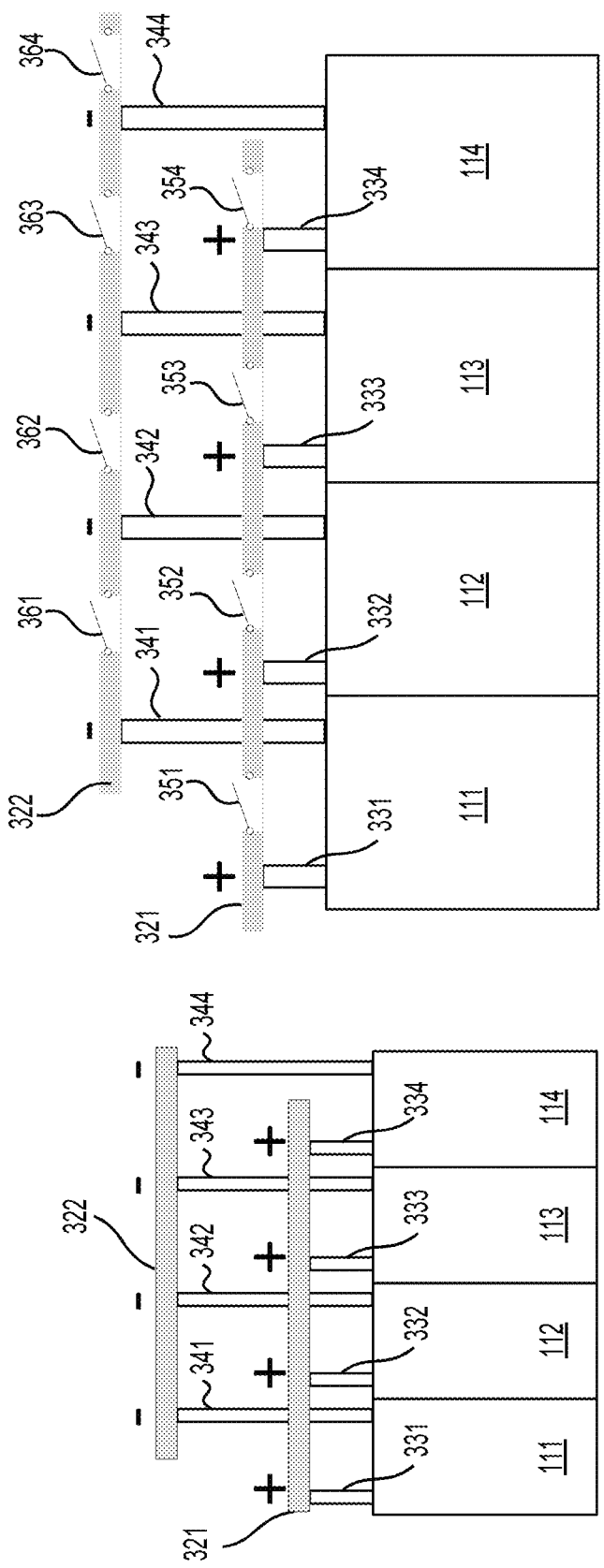
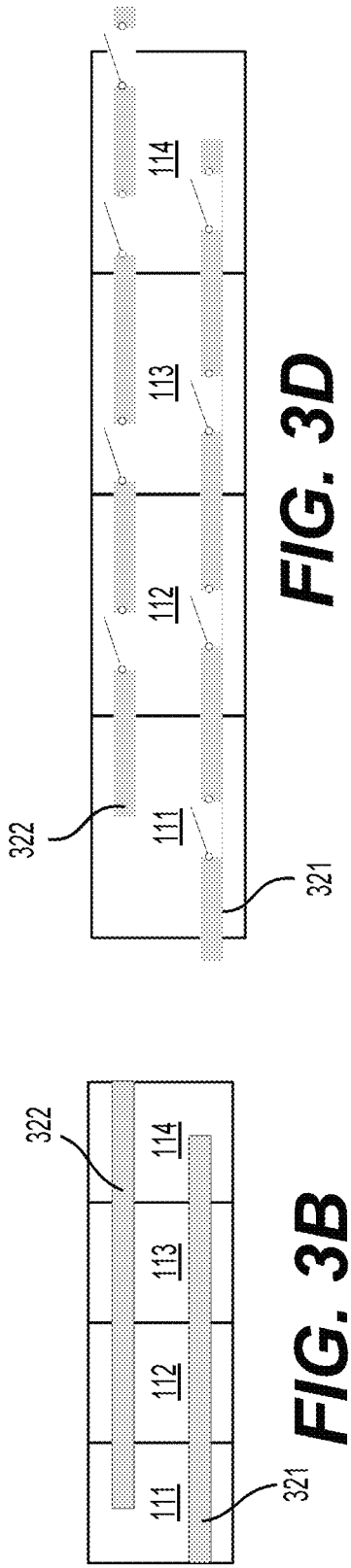
FIG. 3A
FIG. 3B
FIG. 3C
FIG. 3D

BATTERY MODULES, A BATTERY PACK, AND A METHOD FOR REPLACING THE BATTERY MODULES

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

U.S. 20110025268 A1 describes replacing a battery pack of an electronic vehicle. An electric vehicle having a battery-pack to be replaced is stopped opposite a replacing section, its wheels are swiveled automatically to 90 degrees, then the electric vehicle travels to the replacing section when it becomes vacant for releasing there its discharged battery-pack. The electric vehicle then elevates its body in order to clear the discharged battery-pack, and retreats to its waiting station.

SUMMARY

According to the present disclosure, a battery pack is provided. The battery pack includes a first battery module and a second battery module. The first battery module includes a charging socket configured to charge the first battery module. The charging socket is conformed to a standard configuration. The first battery module includes first terminals for electrically coupling to the second battery module and a cooling interface connected to a conduit in the first battery module to cool the first battery module. The cooling interface can be conformed to a standard configuration.

According to an aspect of the present disclosure, the second battery module can include second terminals. The battery pack includes a high voltage (HV) module interconnect system electrically connecting the first and second battery modules via the first and second terminals, respectively. The HV module interconnect system can include one or more switches that are configured to electrically isolate the first battery module from the second battery module. The HV module interconnect system can include one or more switches that are configured to electrically isolate the battery pack from an electric motor in a vehicle where the battery pack is included in the vehicle.

The first battery module can be configured to be charged externally via the charging socket.

In an example, the first terminals are positive and negative direct current (DC) terminals configured to charge the first battery module via fast DC charging and the first terminals form a DC socket that is included in the charging socket.

According to an aspect of the present disclosure, a method of changing a battery module in a vehicle includes electrically isolating the battery module from a HV module interconnection system that connects the battery module and one or more other modules in a battery pack in the vehicle. The battery module includes a charging socket configured to charge the battery module. The charging socket is conformed to a standard configuration. The method includes removing the battery module from a compartment of the vehicle where the battery pack is positioned in the compartment, and installing another battery module into the compartment. The method can include charging the battery module via the charging socket after removing the battery module from the compartment. In an example, charging the battery module includes charging the battery module via a DC socket in the charging socket using fast DC charging where the DC socket includes positive and negative DC terminals.

According to an aspect of the present disclosure, the HV module interconnection system includes one or more switches. Isolating the battery module further includes activating the one or more switches to isolate the battery module from the HV module interconnection system.

According to an aspect of the present disclosure, the method further includes electrically isolating the battery pack from an electric motor of the vehicle.

According to an aspect of the present disclosure, the method further includes positioning the vehicle in a charging station prior to electrically isolating the battery module from the HV module interconnection system. The method can include placing the battery module into a charging bank in the charging station after removing the battery module from the compartment of the vehicle.

The method can include determining whether the other battery module is connected to the battery pack.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

A vehicle, such as an electric vehicle, can include a rechargeable battery pack. The vehicle can be powered by the battery pack. The battery pack can include multiple battery modules. In some examples, recharging the battery pack or a battery module can be time consuming. According to the present disclosure, a battery module can be individually replaced or swapped. When the battery module in the battery pack is depleted, the depleted battery module can be replaced by a fully charged battery module and the depleted battery module can be charged, for example, at a charging station. The battery module can include a plurality of electrical and mechanical connections, for example, for charging, using, and cooling the battery module, for communication, and/or the like. The plurality of electrical and mechanical connections can include one or more charging sockets (or charging ports, charging inlets, receptacles) for charging the battery module, a cooling interface, terminals including a positive terminal (or a positive direct current (DC) terminal) and a negative terminal (or a negative DC terminal), a communication interface, and/or the like. In an example, the terminals including the positive and negative terminals can be integrated into the one or charging sockets. The cooling interface can include an inlet port and an outlet port for circulating a coolant to maintain a suitable temperature for the battery module. The multiple battery modules in the battery pack can be connected using a high voltage (HV) module interconnect system. The battery module can be attachable to the HV module interconnect system to provide electrical power to the vehicle via the terminals. The battery module can communicate with an external device, such as a controller in the vehicle, using the communication interface.

According to the present disclosure, one or more of the plurality of electrical and mechanical connections can be configured to conform to certain standard(s) or standard configuration(s), and thus the battery module can be swapped with another battery module. The one or more charging sockets can include standard charging sockets that can be connected to plugs conformed to certain standards such as a Society of Automotive Engineers (SAE) J1772 (also referred to as an IEC Type 1) plug, a SAE Combo plug, a CHArge de MOve (CHAdeMO) plug, and/or the like. Certain properties, such as heat dissipation properties and electrical properties, of the battery module can be conformed to certain standard(s) or certain standard configuration(s) to facilitate swapping of the battery module.

Figures 1A, 1B:
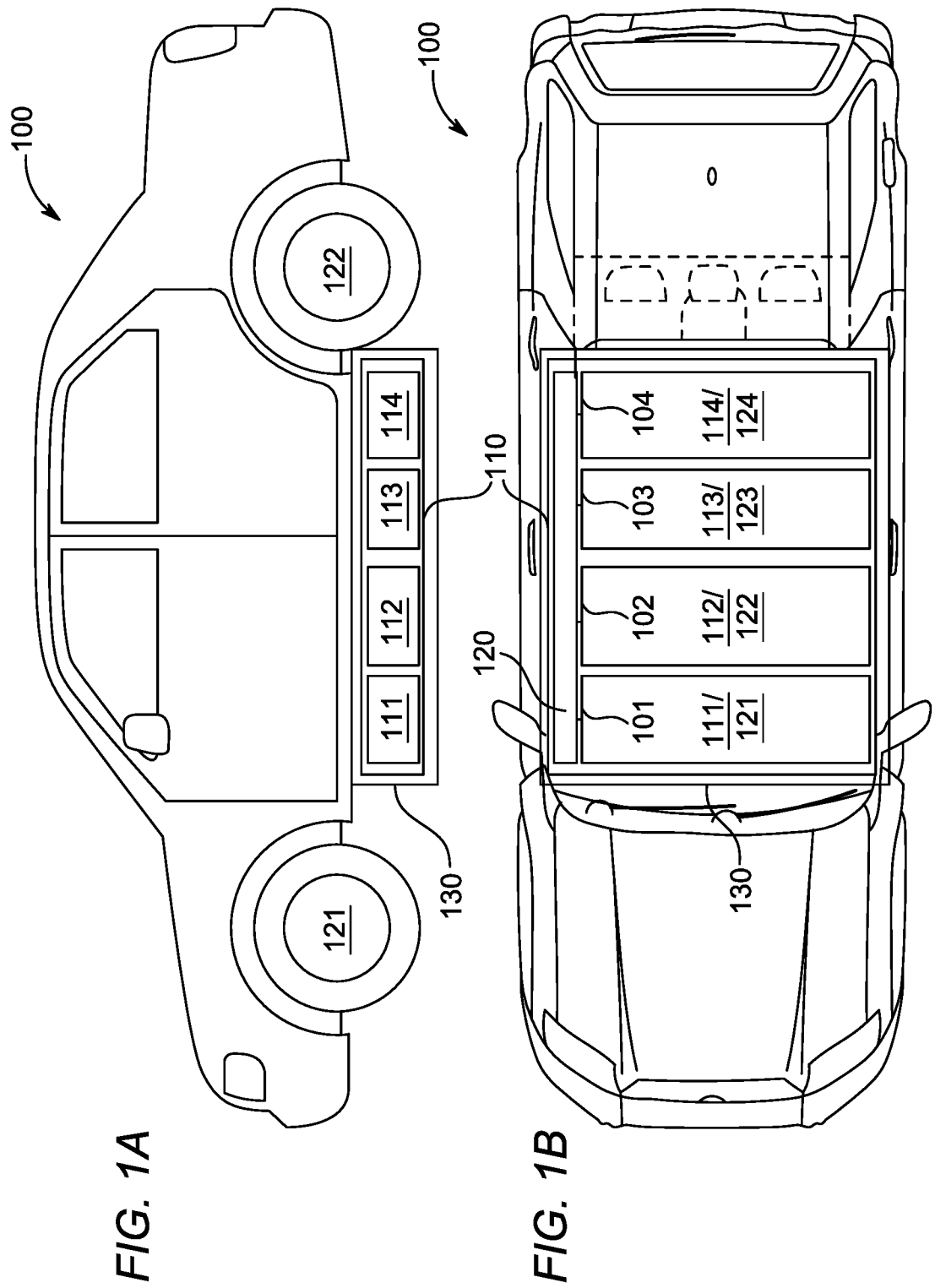
FIGS. 1A-1B show a side view and a top view of an exemplary vehicle including a battery pack according to the present disclosure.

FIG. 1A shows a side view of an exemplary vehicle 100 including a battery pack 110 according to the present disclosure. FIG. 1B shows a bottom view of the vehicle 100 according to the present disclosure. An energy source of the vehicle 100 includes at least the battery pack 110. The vehicle 100 can include an electric motor (not shown) for propelling the vehicle 100. The battery pack 110 can provide power to the electric motor. The vehicle 100 can include additional battery pack(s). The vehicle 100 can be solely powered by electrical power. The vehicle 100 can be powered by electrical power and other energy sources, such as gasoline, compressed hydrogen, and/or the like. The vehicle 100 can be an all-electric or battery electric vehicle (AEV or BEV), a plug-in electric vehicle, a plug-in hybrid vehicle, a hybrid electric vehicle, or the like.

The battery pack 110 can be located in any suitable location. Referring to FIGS. 1A-1B, the battery pack 110 is positioned underneath the vehicle 100 and between a front wheel 121 and a rear wheel 122. By way of example (not shown), the battery pack 110 is positioned underneath a cargo area where the cargo area is at a rear end of the vehicle 100.

The battery pack 110 includes multiple battery modules 111-114. FIG. 1A shows a left side of the battery modules 111-114. FIG. 1B shows a bottom side of the battery modules 111-114. The battery modules 111-114 can be accessed from the bottom side, the left side, a right side, or the like for removal and/or installation of the battery modules 111-114. Similarly, the battery pack 110 can be accessed from the bottom side, the left side, the right side, or the like for removal and/or installation of the battery pack 110.

In general, the battery modules 111-114 can be connected in any suitable circuit configuration, such as in a parallel circuit to increase amp-hour capacity, in a series circuit to increase a voltage output and thus obtain a desired voltage, or in a series-parallel circuit. As shown in FIG. 1B, the battery modules 111-114 can be connected in a parallel circuit via a HV module interconnect system 120.

Each of the battery modules 111-114 can include a battery housing 121/122/123/124 and a battery (not shown) having a plurality of battery cells, such as lithium ion cells. An output voltage of the battery module can be a few hundred volts (V), such as 200 to 800 V. By way of example, 96 battery cells are organized into 8 battery modules where each battery module includes 12 battery cells. The 8 battery modules form a battery pack. The battery can be sealed inside the battery housing 121/122/123/124. The battery housings 121-124 can be constructed using any durable material(s), such as metal(s), alloy(s), composite material(s), combination(s) thereof to support and protect the battery from external shocks, such as heat, vibration, crashing, and/or the like. The battery housings 121-124 can include waterproof and fire retardant material(s), such as aluminum or stainless steel. The battery housings 121-124 can include a plurality of electrical and mechanical connections for charging, using, and cooling the battery module, for communication, and/or the like, as described above and described below with reference to FIG. 2.

The battery pack 110 can be located in a battery compartment 130. The battery compartment 130 can be attached to the vehicle 100 and provide mechanical support to the battery pack 110 including the battery modules 111-114. The battery compartment 130 and the battery modules 111-114 can include any suitable mechanical and/or electromechanical structures or members configured to secure the battery modules 111-114 in the battery compartment 130 and to facilitate installation and removal of the battery module into and out of the battery compartment 130, such as fastening structures and alignment structures. The mechanical and/or electromechanical structures can include bolts, nuts, protrusion structures (e.g., poles or posts), recesses, slots, fasteners, latches, springs, and/or the like. One or more of the mechanical and/or electromechanical structures can be controlled remotely, for example, by activating a button in a control area of the vehicle 100. The button can be a virtual button on a touch screen.

Each of the battery modules 111-114 can include one or more sensors, such as temperature sensor(s), voltage sensor(s), and current sensor(s). The battery module can include a conduit for coolant that is connected to the cooling interface. The battery module can be controlled by a controller, such as a battery management system (BMS). The controller can measure and control a temperature of the battery module, monitor and indicate a charging status (or a battery level), and monitor and indicate a quality (such as a lifetime) of the battery module. The controller can be located in the battery module, and thus each battery module can have the respective controller. The controller can also be located externally, such as in the battery pack 110, the vehicle 100, or a charging station. The battery housing can include a communication interface (also referred to as a vehicle communication connection) that is configured to communicate with an external device, such as the controller of the vehicle 100 or a controller at a charging station.

A HV module interconnect system 120 can include one or more service plugs or switches. When a set of the one or more service plugs is removed, the battery module can be electrically isolated from remaining battery modules in the battery pack 110, thus facilitating a safe change of or service for the battery module. The battery pack 110 can also be isolated similarly by removing a service plug or opening a switch in the HV module interconnect system 120.

As described above, the battery housing can include the plurality of electrical and mechanical connections. Referring to FIG. 1B, the plurality of electrical and mechanical connections can be located on sides 101-104 of the respective battery modules 111-114. According to the present disclosure, one or more of the plurality of electrical and mechanical connections can include standard charging socket(s) conformed to certain standard(s) or standard configuration(s) that are used by different manufacturers to manufacture battery modules, and thus can be connected to a standard charging plug, such as J1772 and CSS2. Further, different battery modules can have identical or compatible regulations regarding heat dissipation properties, electrical properties, physical sizes and shapes, and the like of the battery module, that facilitate replacing individual battery modules. Accordingly, a depleted or a faulty battery module can be individually replaced, for example, during a long trip (e.g., more than 150 miles) at a charging station where a technician or a robot can replace the depleted or the faulty battery module with a fully charged battery module having compatible or identical charging sockets. The replacement can be completed within a duration comparable to that of refueling a gasoline powered vehicle. Therefore, a user of the vehicle 100 does not need to wait for a long time to charge the depleted battery pack 110 or the depleted battery module.

Figure 2:
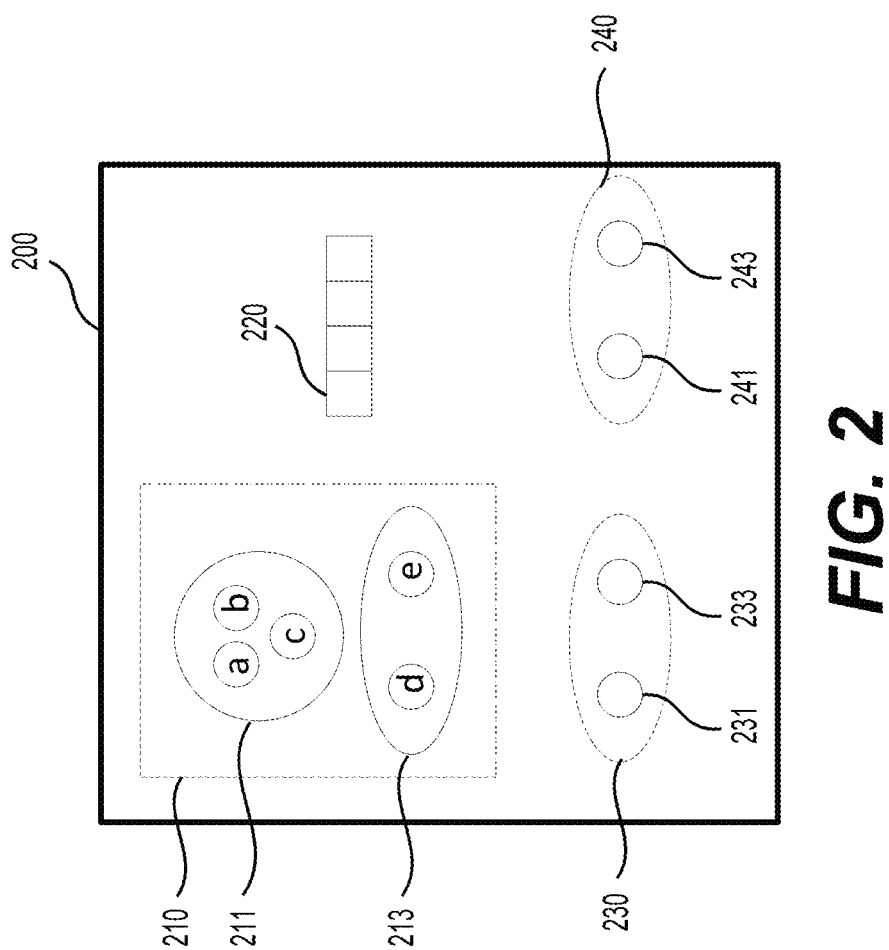
FIG. 2 is an exemplary interface of a battery module according to the present disclosure.

FIG. 2 is an exemplary interface 200 of a battery module according to the present disclosure. The battery module can be one of the battery modules 111-114. The interface 200 can be located on the battery housing. The interface 200 can include a charging socket 210, a communication interface 220, a cooling interface 230, and/or the like. The charging socket 210 can be any suitable charging socket, such as an alternating current (AC) socket, a DC socket, a combination of an AC socket and a DC socket, or the like. In general, an AC socket is configured to charge the battery module using an alternating current, for example, via a single phase or 3-phase. A DC socket is configured to charge the battery module using a direct current, for example, via fast DC charging. Referring to FIG. 2, the charging socket 210 can include an AC socket 211 for 3-phase AC charging and a DC socket 213 for fast DC charging. In an example, the AC socket can include a terminal for negative line voltage a, a terminal for positive line voltage b, and a terminal for neutral c. The DC socket 213 can include a positive DC terminal d and a negative DC terminal e.

According to the present disclosure, the charging socket 210 can be a standard charging socket that can be connected or mated to a standard charging plug, such as a SAE J1772 plug, a SAE Combo plug, a CHAdeMO plug, an International Electrotechnical Commission (IEC) 62196 plug, or the like, to facilitate replacing the battery module individually. In an example, the charging socket 210 can be configured to conform to International Electrotechnical Commission (IEC) 62196 that includes configurations for suitable operable voltages, frequencies, current levels, and/or the like. In an example, the vehicle 100 can be configured to conform to International Organization for Standardization (ISO) 17409 and ISO 18246. The interface 200 can include additional charging socket(s) based on design considerations for the battery module. The charging socket 210 can include pin(s) for signaling control information and/or battery module information. The charging socket 210 can also include a terminal, such as a 24 V terminal for battery management functionality during offline charging. The battery module can include an AC/DC convertor.

In an example, a charging socket can include a plurality of terminals, such as a terminal for negative line voltage, a terminal for positive line voltage, a terminal for neutral, a terminal for ground, a positive DC terminal, and a negative DC terminal. The plurality of terminals can be configured in a variety of ways to achieve 3-phase AC charging, single phase AC charging, DC fast charging, and/or the like. Accordingly, the charging socket can be mated to a standard charging plug, such as J1772, Combined Charging System (CCS)1, CCS2, or the like.

The cooling interface 230 includes an inlet port 231 and an outlet port 232 connected to corresponding ports on the vehicle 100 or other battery module(s), allowing a coolant to flow through the battery module, for example, to maintain a suitable temperature during operation of the vehicle 100 and/or charging of the battery module. The inlet port 231 and the outlet port 232 can be connected to a conduit inside the battery module. A pump (not shown) in the vehicle 100 can be used to pump the coolant during the operation of the vehicle 100 to maintain a suitable temperature of the battery module. When the battery module is removed from the vehicle 100 and is being charged externally, a pump at a charging station can maintain a suitable temperature of the battery module, for example, during fast DC charging. When the battery module is removed from the vehicle 100 and is being charged externally, the inlet port 231 and the outlet port 232 can be sealed and no cooling is implemented during charging, such as charging at home. The inlet port 231 and the outlet port 232 can be standard ports used for cooling and can be used in different vehicles. A leakless quick disconnect fitting can be used for the inlet and outlet ports 231-232.

In an example, the same cooling interface 230 is used during operation of the vehicle 100 and when charging the battery module, such as in DC fasting charging. Alternatively, the cooling interface 230 is used to maintain a suitable temperature during the operation of the vehicle 100, and another cooling interface 240 including an inlet port 241 and an outlet port 242 is used to maintain a suitable temperature for the battery module during charging, such as fast DC charging at a charging station.

The communication interface 220 can be configured to communicate with an external device, such as a controller (e.g., a battery management unit (BMU), a battery management system (BMS), an Electronic Control Unit (ECU) in the vehicle 100), using any suitable communication technologies, such as wired, wireless, fiber optic communication technologies, and any suitable combination thereof. The communication interface 220 can use wireless technologies, such as IEEE 802.15.1 or Bluetooth, IEEE 802.11 or Wi-Fi, mobile network technologies, and the like. The communication interface 220 can send battery module information that indicates, for example, temperature, voltage, current, battery module status, and/or the like to the external device. The battery module status can indicate remaining power of the battery module, thus indicating whether the battery module needs to be recharged or swapped. The communication interface 220 can be designed with robustness for high connection cycles. In an example, the communication interface 220 can be conformed to a certain standard or standard configuration, such as common across manufacturers.

In general, the charging socket 210, the communication interface 220, the cooling interface 230, and/or the like in the interface 200 can be located on one or more sides of the battery module. As shown in FIG. 2, the charging socket 210, the communication interface 220, the cooling interface 230, and/or the like, in the interface 200 can be located on a single side, such as one of the sides 101-104, of the battery module. Alternatively, the charging socket 210, the communication interface 220, the cooling interface 230, and/or the like, in the interface 200 are located on a plurality of sides of the battery module.

As described above, the battery pack 110 can include multiple battery modules connected in any suitable circuit configuration. FIGS. 3A-3B show a top view and a side view of an exemplary battery pack, respectively, according to the present disclosure. The battery pack 110 includes the battery modules 111-114 connected in a parallel circuit. The HV module interconnect system 120 can include a first bus bar 321 and a second bus bar 322. Positive terminals 331-334 of the respective battery modules 111-114 can be connected by the first bus bar 321. Negative terminals 341-344 of the respective battery modules 111-114 can be connected by the second bus bar 322. In an example, the positive and negative terminals 331 and 341 are the positive and negative terminals d-e in the DC socket 213. Similarly, the positive and negative terminals 332 and 342 can be the positive and negative terminals d-e in the DC socket 213; the positive and negative terminals 333 and 343 can be the positive and negative terminals d-e in the DC socket 213; and the positive and negative terminals 334 and 344 can be the positive and negative terminals d-e in the DC socket 213.

The first and second bus bars 321-322 can include any suitable conducting material(s), such as copper, aluminum, metal alloy(s), and/or the like, and have any suitable shape(s) and size(s). The positive and negative terminals 331-334 and 341-344 can have any suitable shape(s), material(s), and locations to enable robust connections with corresponding contacts, such as the first and second bus bars 321-322, in the vehicle 100.

Various mechanisms can be used for robust connections for the positive and negative terminals 331-334 and 341-344. Springs can be used to facilitate removal or installation of the respective battery module. As shown in FIG. 3A, the positive and negative terminals 331-334 and 341-344 can be poles or posts protruding from the respective battery modules 111-114. One or more of the positive and negative terminals 331-334 and 341-344 can be recessed into the respective battery modules 111-114 and respective poles of the first and second bus bars 321-322 can be inserted into the one or more of the positive and negative terminals 331-334 and 341-344. The positive and negative terminals 331-334 and 341-344 can be located on a same side of the respective battery module 111-114, as shown in FIG. 3A. Alternatively, the positive and negative terminals 331-334 and 341-344 can be located on different sides of the respective battery module 111-114.

FIGS. 3C-3D show a top view and a side view the battery pack 100 having a parallel circuit, respectively, according to the present disclosure. Components in the parallel circuit in FIGS. 3C-3D are similar or identical to those in FIGS. 3A-3B, and thus detailed descriptions are omitted for purposes of brevity. The parallel circuit further includes safety features as described below. The first bus bar 321 can include switches 351-354 and the second bus bar 322 can include switches 361-364. The switches 351-354 and 361-364 can be used to isolate one or more of the battery modules 111-114, for example, from the battery pack 110 or the electric motor when the one or more of the battery modules 111-114 are to be removed from the battery pack 110. For example, when the battery module 112 is to be removed for recharging, the switches 351-352 and 361-362 can be placed in open positions to isolate the battery module 112, and thus reducing potential electrical danger when removing the battery module 112. For example, when the compartment 130 is opened or accessed to replace the battery module 112, a sensor detects that the compartment 130 is open and sends the information to, for example, a controller of the vehicle 100. The controller can then isolate the battery module 112 by opening the switches 351-352 and 361-362. Alternatively, the switches 351-352 and 361-362 can also be opened manually by activating a button in a control area of the vehicle 100. Subsequently, the positive terminal 332 and the negative terminal 342 can be disconnected from the first bus bar 321 and the second bus bar 322, respectively. When the battery module 112 is installed into the vehicle 100, the switches 351-352 and 361-362 that are open can be closed either automatically or manually.

The battery pack 110 can be isolated from the electrical motor or the vehicle 100 by opening at least one of the switches 354 and 364. When the compartment 130 is opened to replace a battery module, a sensor detects that the compartment 130 is open and sends the information to, for example, the controller of the vehicle 100. The controller can then isolate the HV module interconnect system 120 or the battery pack 110 by opening the switch 354 and/or the switch 364. Similarly, the switches 354 and 364 can be opened manually by activating a button in the control area of the vehicle 100. When the compartment 130 is closed, the switches 354 and 364 can be placed into close positions either automatically or manually. For example, the sensor can sense that the compartment 130 is closed, and thus the controller can trigger the switches 354 and 364 to be closed. Alternatively, a button can be activated in the control area of the vehicle to close the switches 354 and 364.

In the FIGS. 3A-3D examples, the battery modules 111-114 are coupled together by a bus architecture including the first and second bus bars 321-322. Other suitable connection techniques can also be used in the HV module interconnect system 120.

In general, the battery modules 111-114 in the battery pack 110 can be arranged in any suitable configuration based on desired electrical properties of the battery pack 110. The HV module interconnect system 120 can be adapted accordingly, for example, to include additional bus bars and switches. FIGS. 3E-3O show the HV module interconnect system 120 including bus bars 391-392 and switches 371-387 according to aspects of the disclosure. The bus bars 391-392 can be connected to an electric motor 393 for propelling the vehicle 100. The HV module interconnect system 120 can be used to connect one or more of the battery modules 111-114 to the electric motor 393 and accordingly various circuit configurations can be obtained by adjusting configurations of the switches 371-387.

Figure 3E:
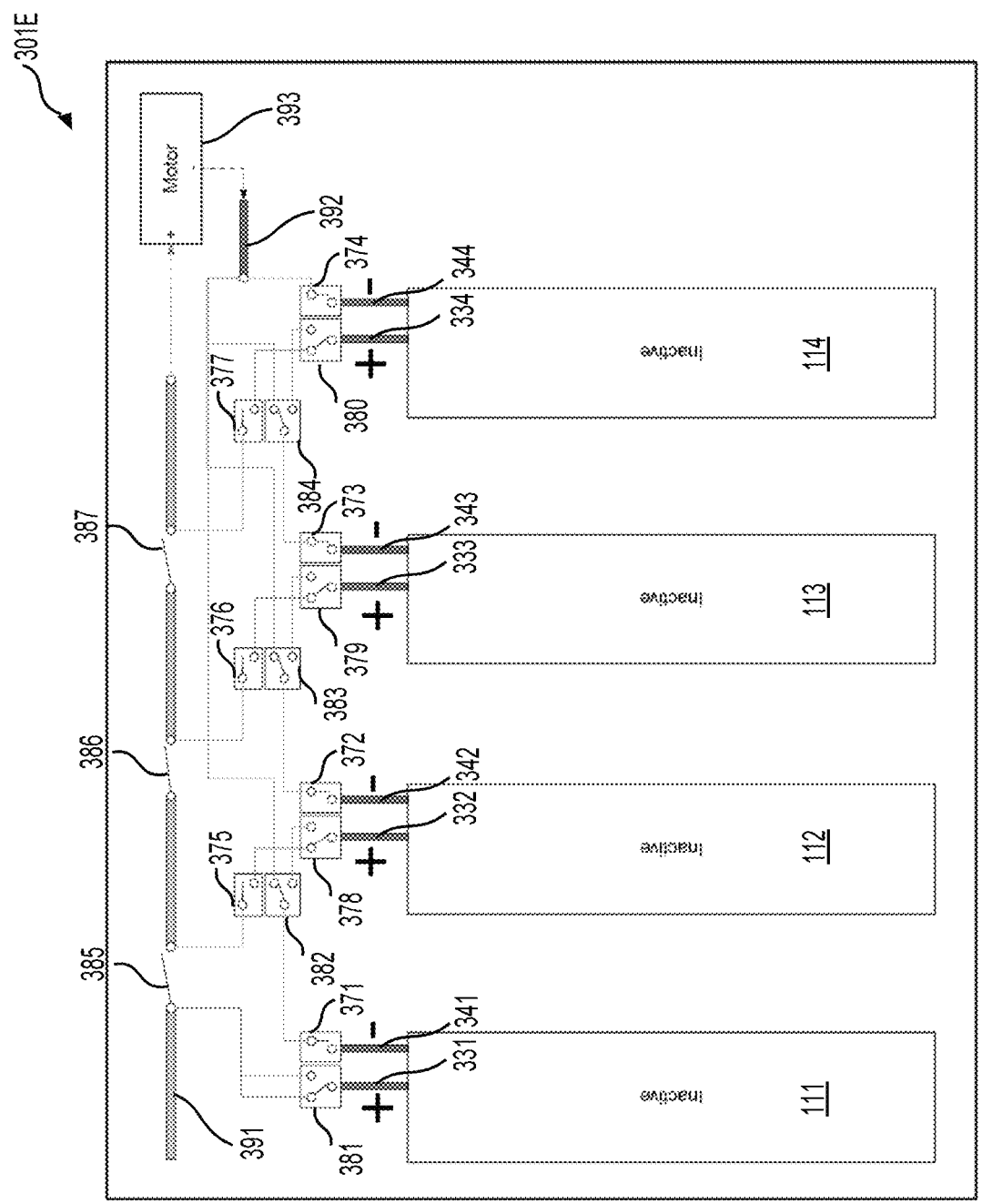
FIGS. 3A-3O show exemplary battery packs according to the present disclosure.

Referring to FIG. 3E, a circuit 301E includes the battery modules 111-114, the electric motor 393, and the HV module interconnect system 120. The battery modules 111-114 are disconnected from the electric motor 393 and from each other, and thus are inactive. In an example, the switches 371-377, 381, and 385-397 are Single Pole Single Throw (SPST) relays. The switches 378-380 and 382-384 are Single Pole Double Throw (SPDT) relays. The switches 371-374 can be configured to determine active/inactive states of ground connections (e.g., the negative terminals 341-344) for the battery modules 111-114, respectively. The switches 375-377 can be configured to determine active/inactive states of positive contacts (e.g., the positive terminals 342-344) for the battery modules 112-114, respectively. For example, when one of the switches 375-377 is connected or active, the respective terminal is in parallel connection; otherwise, the respective terminal is in a series connection or disconnected. The switches 378-380 can configure positive terminal connection(s) in a parallel or a series connection. The switch 381 can be configured to determine active/inactive state of positive connection at an end of line (EOL). The switches 382-384 can be configured to determine whether two adjacent battery modules are configured in a series connection or a parallel connection. The switches 385-387 can be configured for dual redundancy for positive contact active/inactive connection.

Figure 3F:
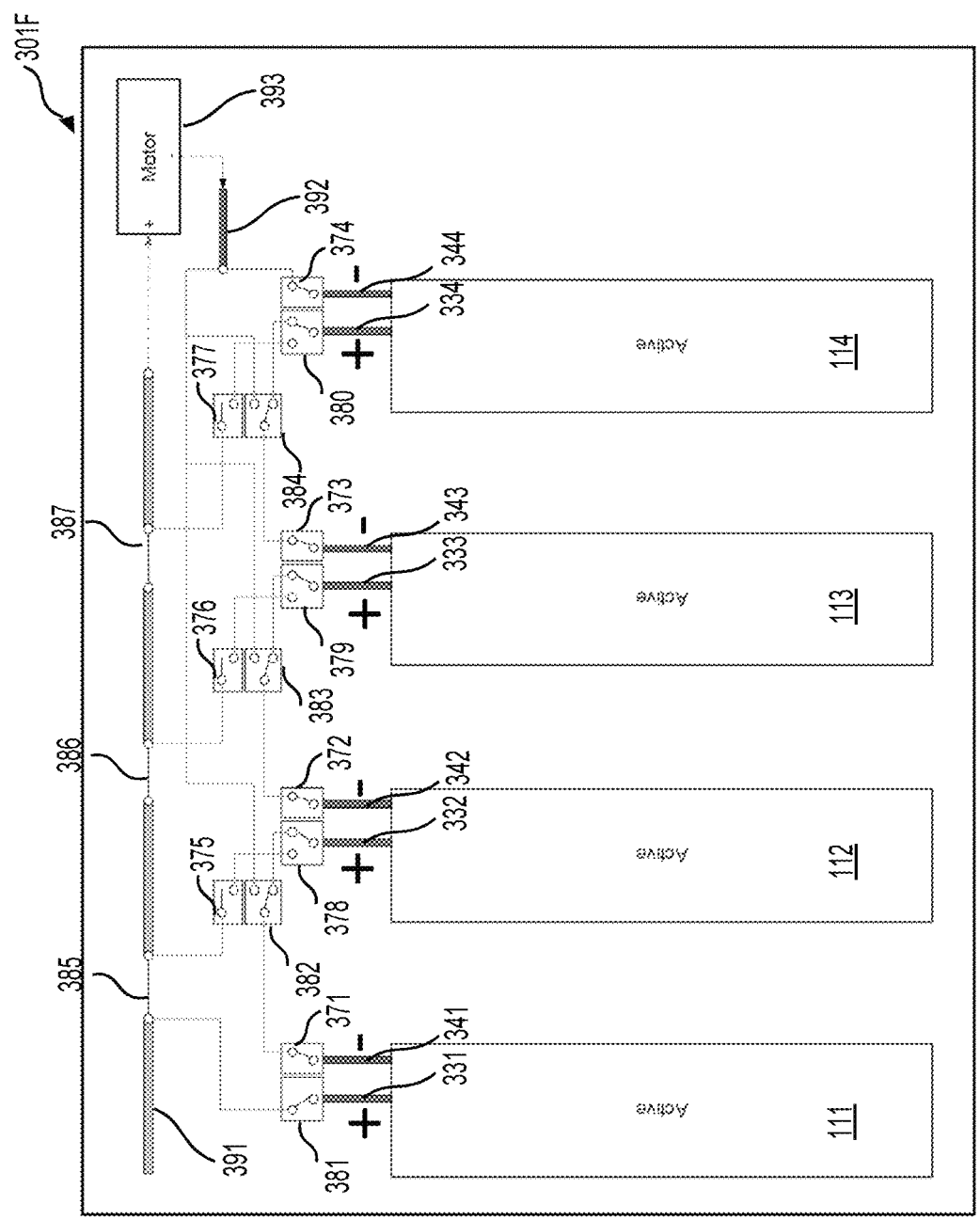

Referring to FIG. 3F, a circuit 301F includes the battery modules 111-114, the electric motor 393, and the HV module interconnect system 120. The battery modules 111-114 are connected in series, and then connected to the electric motor 393.

Figure 3G:
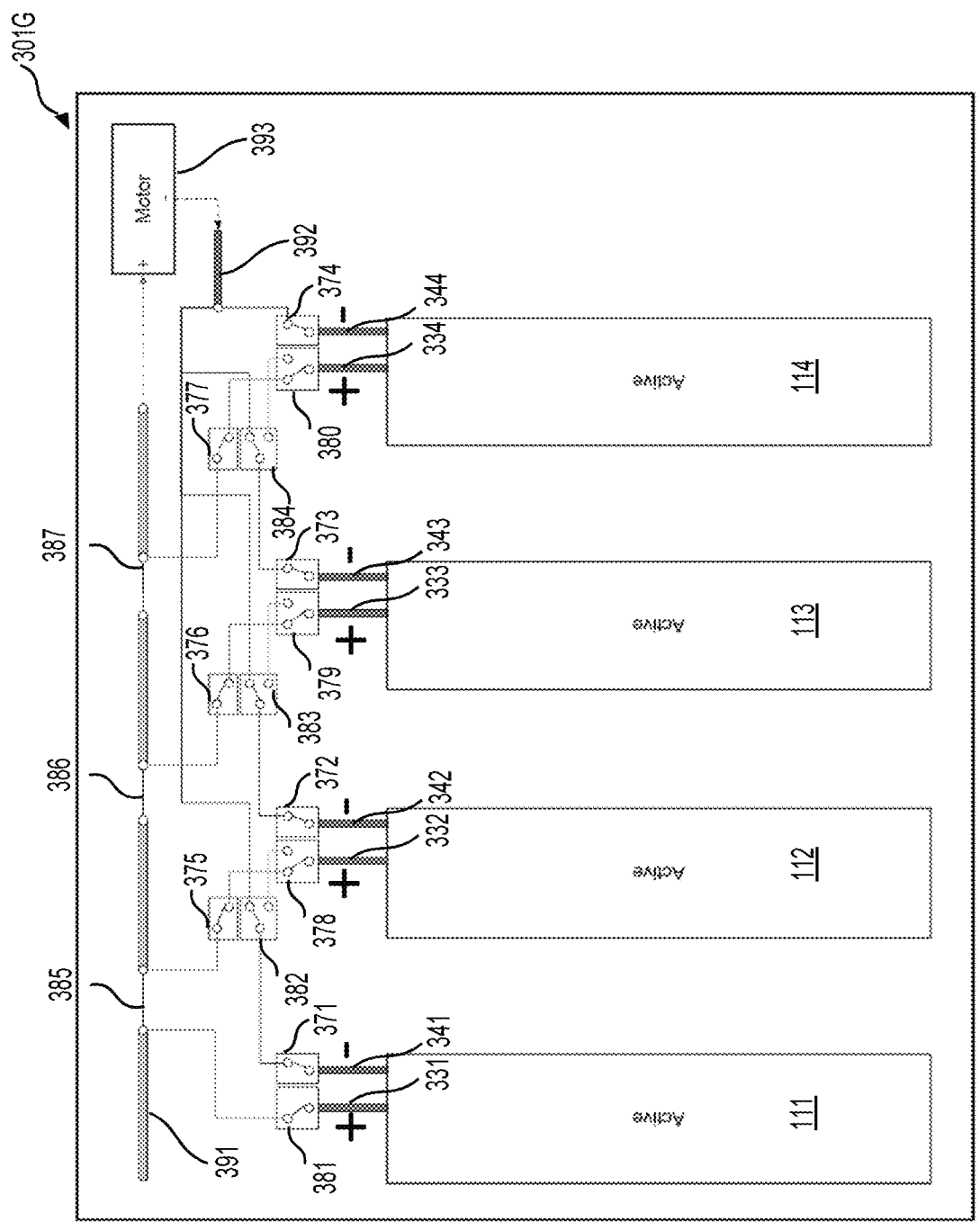

Referring to FIG. 3G, a circuit 301G includes the battery modules 111-114, the electric motor 393, and the HV module interconnect system 120. The battery modules 111-114 are connected in parallel, similar to that shown in FIG. 3A or FIG. 3C, and then connected to the electric motor 393.

Figure 3H:
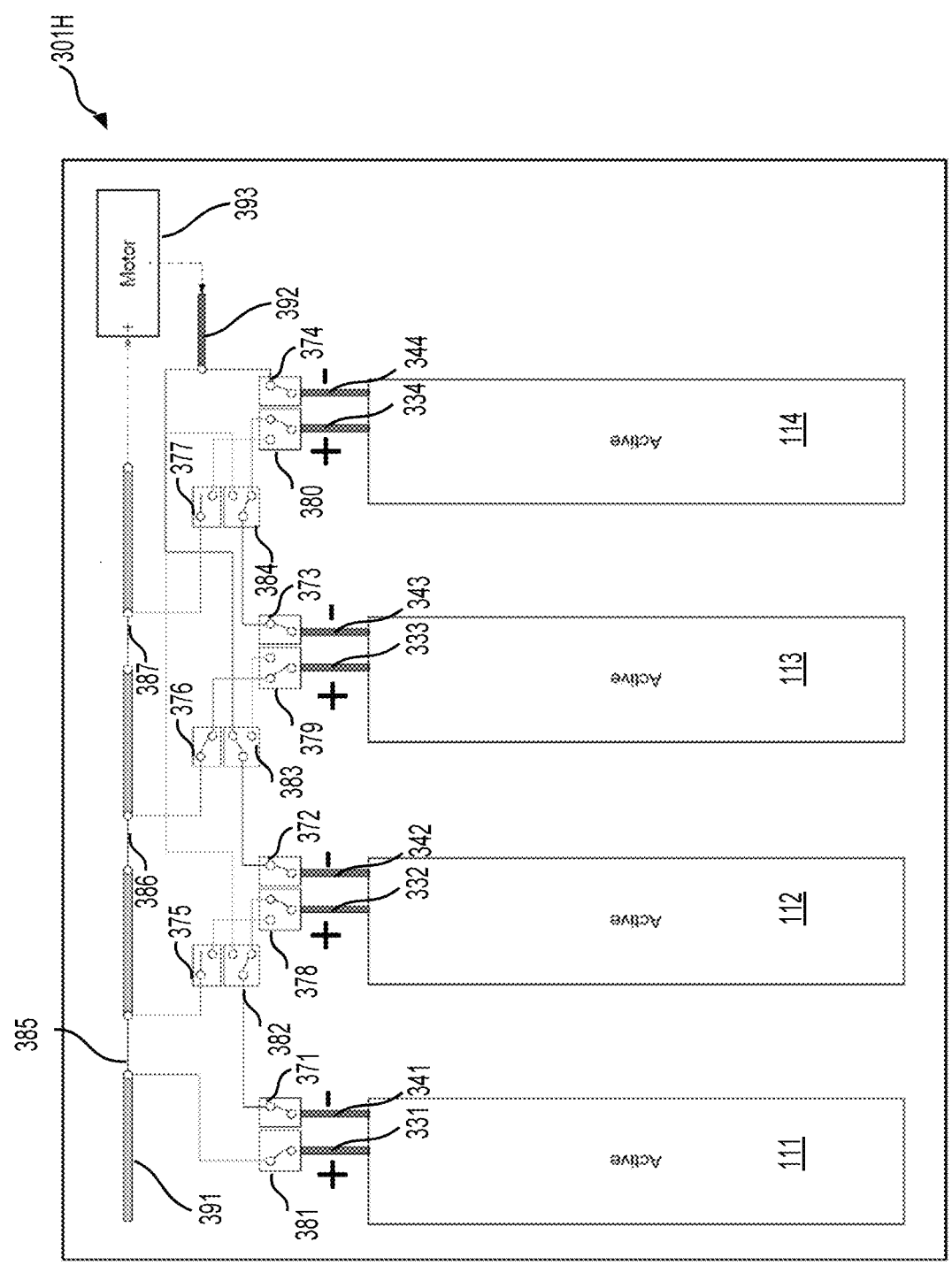

Referring to FIG. 3H, a circuit 301H includes the battery modules 111-114, the electric motor 393, and the HV module interconnect system 120. The battery modules 111-112 are connected in series as a first component, the battery modules 113-114 are connected in series as a second component, and the first and second components are connected in parallel. The first and second components can be connected to the electric motor 393.

Figure 3I:
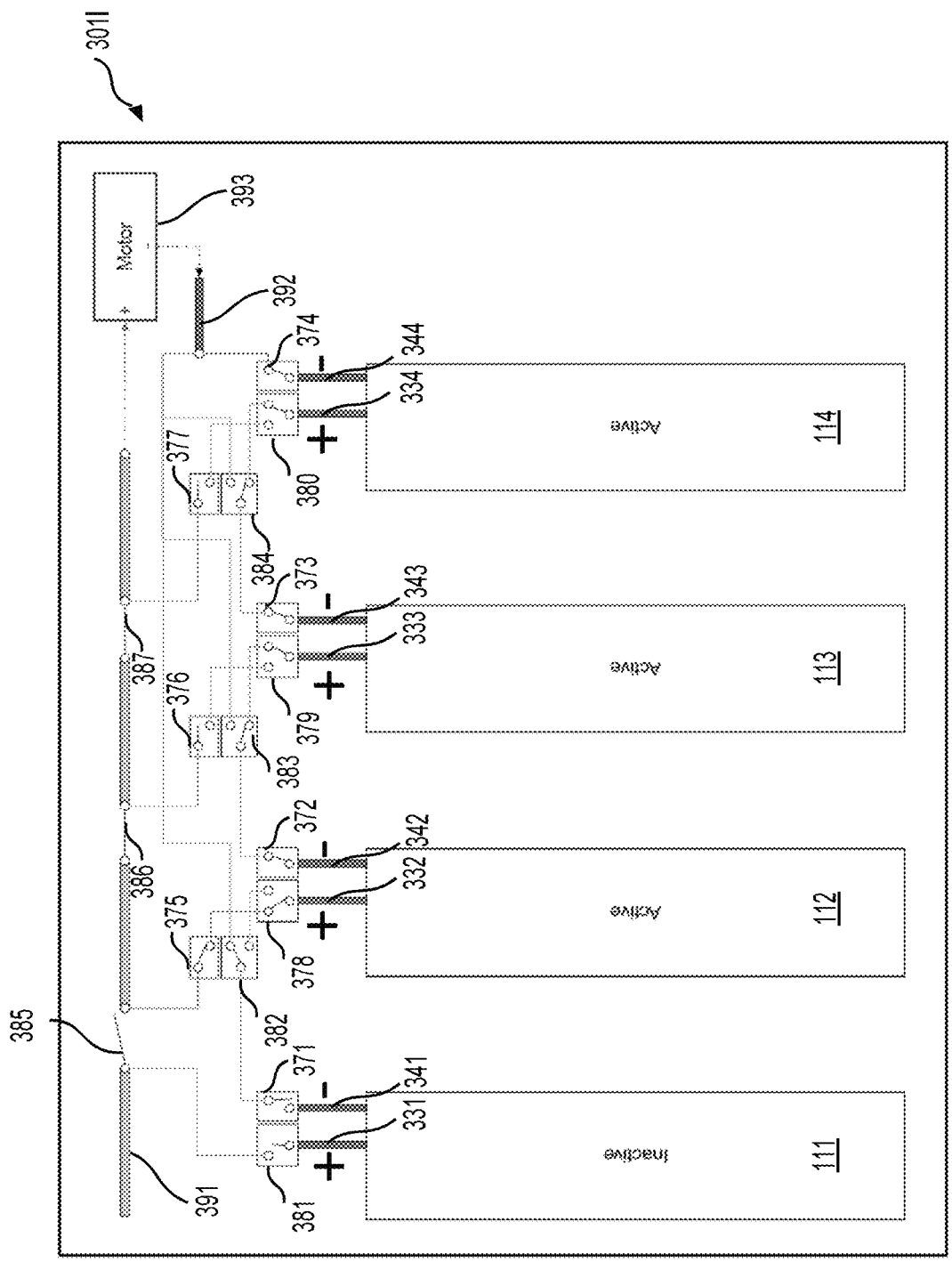

Referring to FIG. 3I, a circuit 301I includes the battery modules 111-114, the electric motor 393, and the HV module interconnect system 120. The battery module 111 is disconnected from the battery modules 112-114 and the electric motor 393. The battery modules 112-114 are connected in series, and then can be connected to the electric motor 393. Accordingly, the battery module 111 is inactive and the battery modules 112-114 can be active.

Figure 3J:
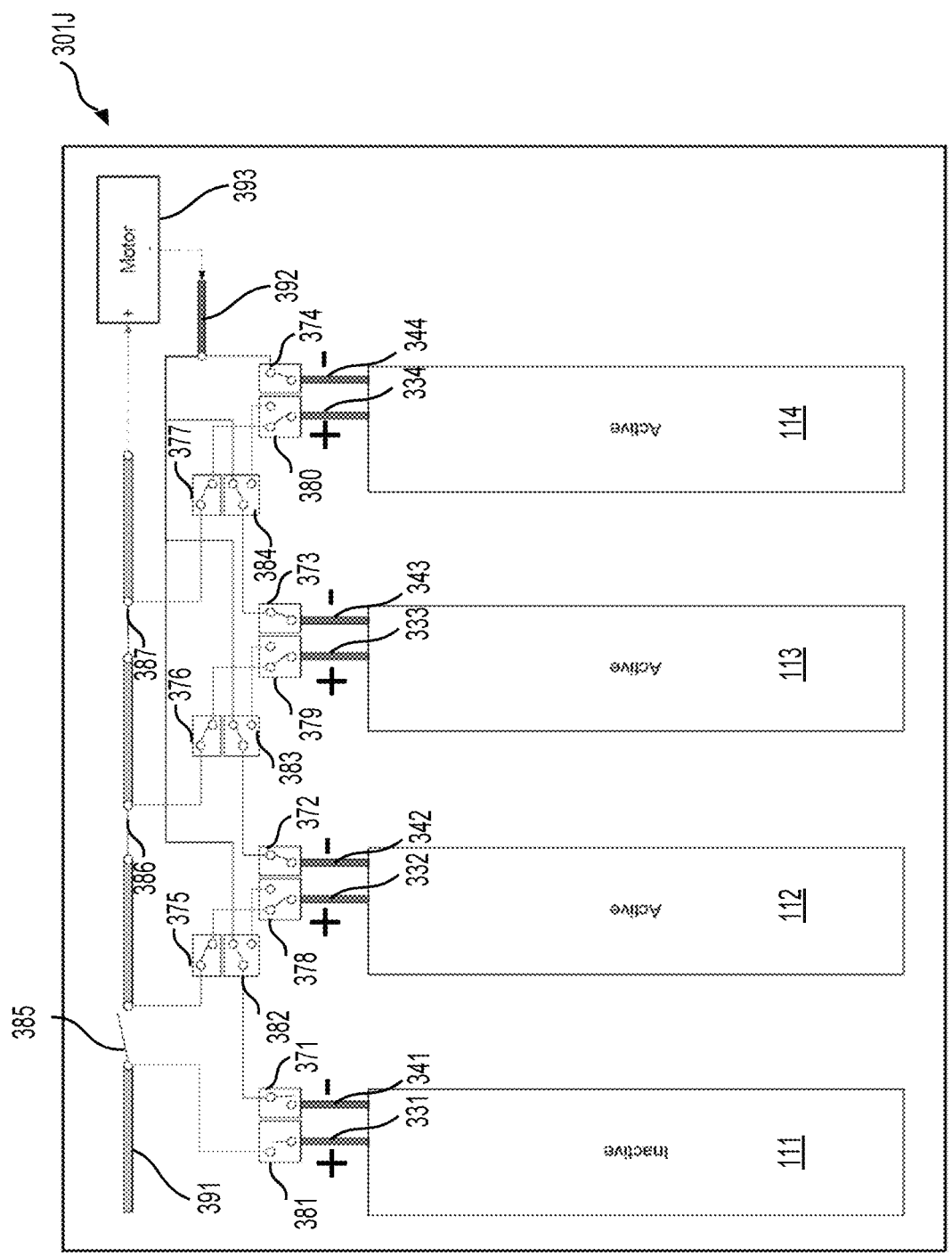

Referring to FIG. 3J, a circuit 301J includes the battery modules 111-114, the electric motor 393, and the HV module interconnect system 120. The battery module 111 is disconnected from the battery modules 112-114 and the electric motor 393. The battery modules 112-114 are connected in parallel, and then can be connected to the electric motor 393. Accordingly, the battery module 111 is inactive and the battery modules 112-114 can be active.

Figure 3K:
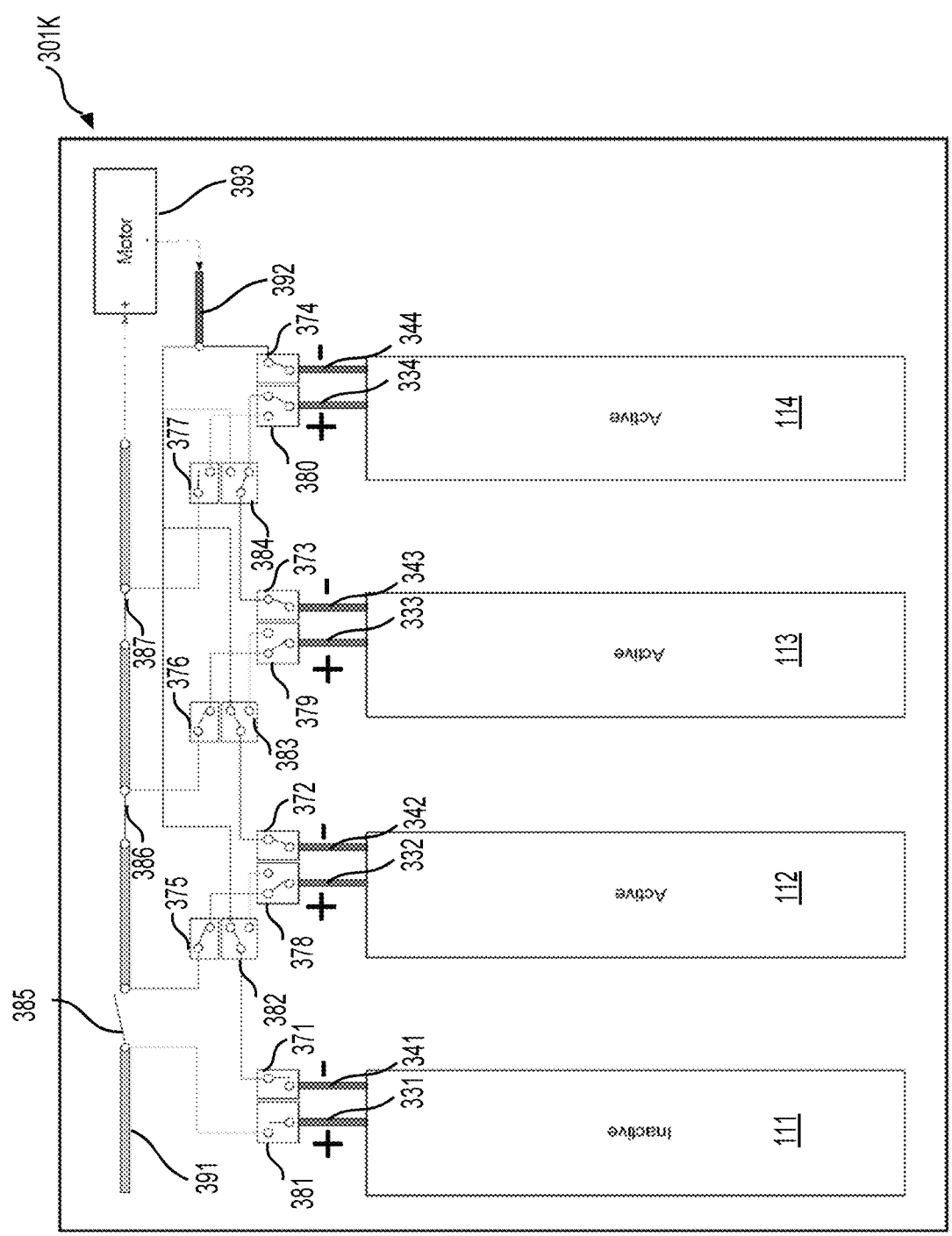

Referring to FIG. 3K, a circuit 301K includes the battery modules 111-114, the electric motor 393, and the HV module interconnect system 120. The battery module 111 is disconnected from the battery modules 112-114 and the electric motor 393. The battery modules 113-114 are connected in series as a first component, and the first component is connected to the battery module 112 in parallel. Further, the first component and the battery module 112 can be connected to the electric motor 393. Accordingly, the battery module 111 is inactive and the battery modules 112-114 can be active.

Figure 3L:
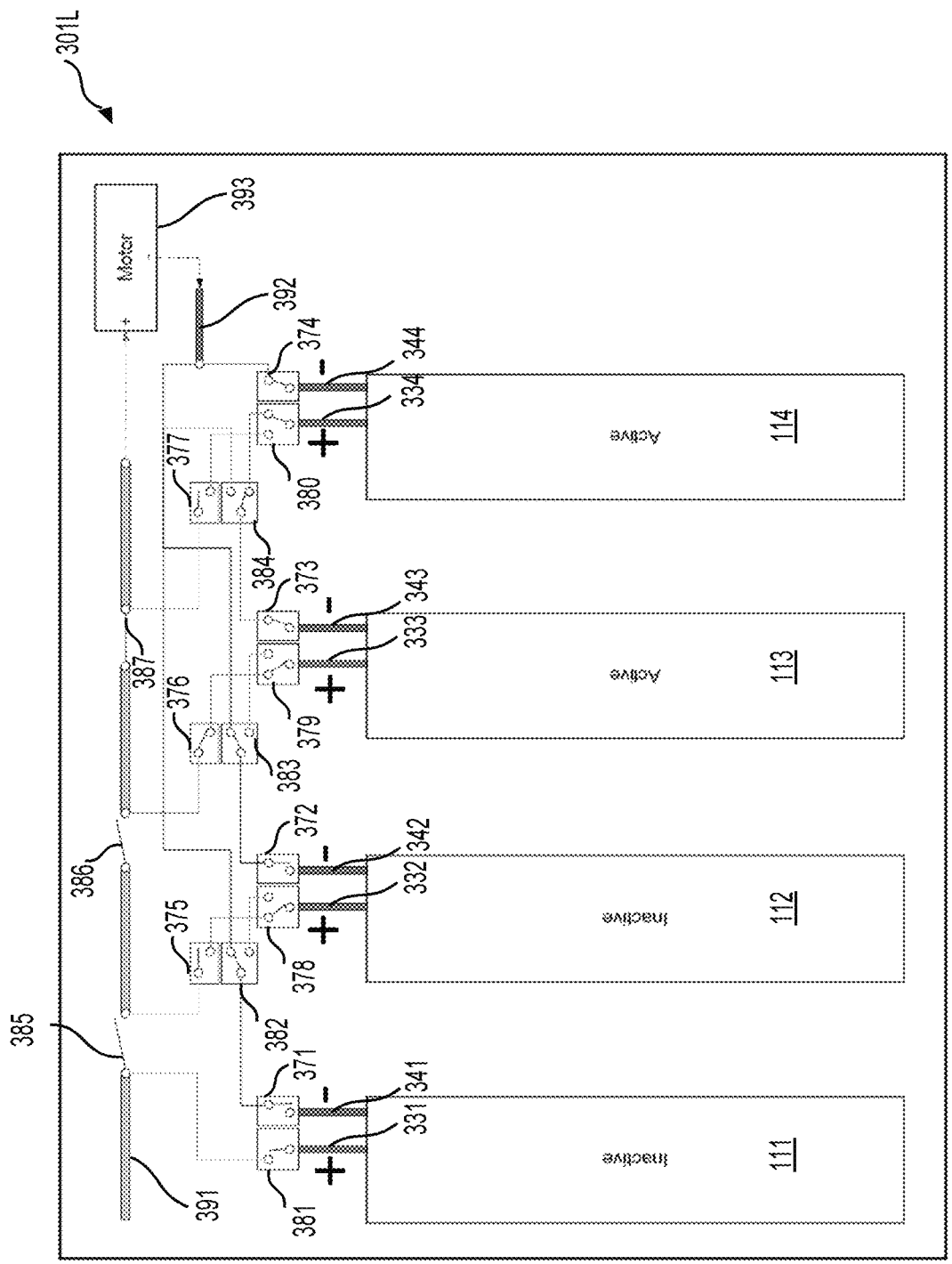

Referring to FIG. 3L, a circuit 301L includes the battery modules 111-114, the electric motor 393, and the HV module interconnect system 120. The battery modules 111-112 are disconnected from the battery modules 113-114 and the electric motor 393. The battery modules 111-112 are also disconnected from each other. The battery modules 113-114 are connected in series, and then can be connected to the electric motor 393. Accordingly, the battery modules 111-112 are inactive and the battery modules 113-114 can be active.

Figure 3M:
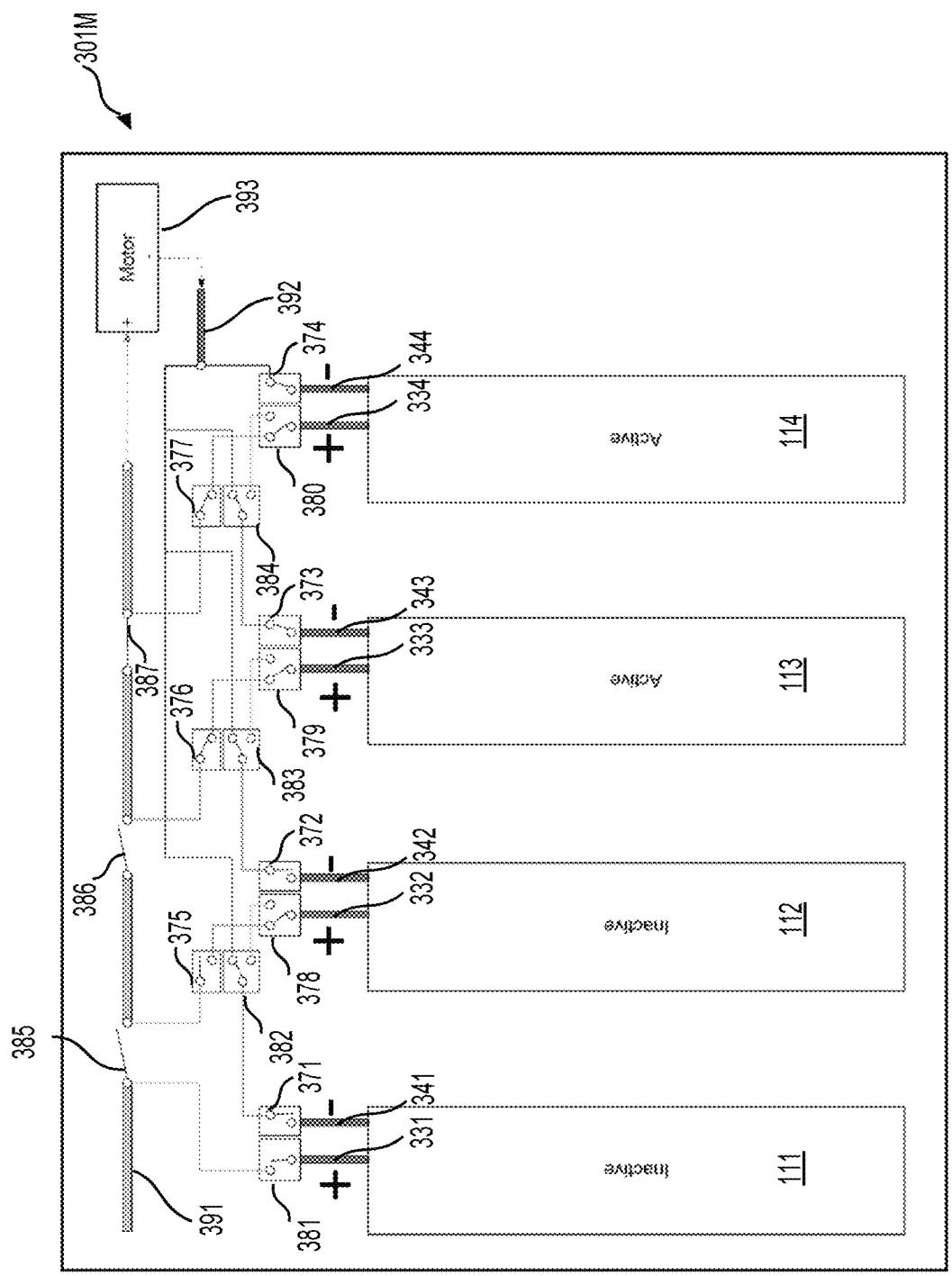

Referring to FIG. 3M, a circuit 301M includes the battery modules 111-114, the electric motor 393, and the HV module interconnect system 120. The battery modules 111-112 are disconnected from the battery modules 113-114 and the electric motor 393. The battery modules 111-112 are also disconnected from each other. The battery modules 113-114 are connected in parallel, and then can be connected to the electric motor 393. Accordingly, the battery modules 111-112 are inactive and the battery modules 113-114 can be active.

Figure 3N:
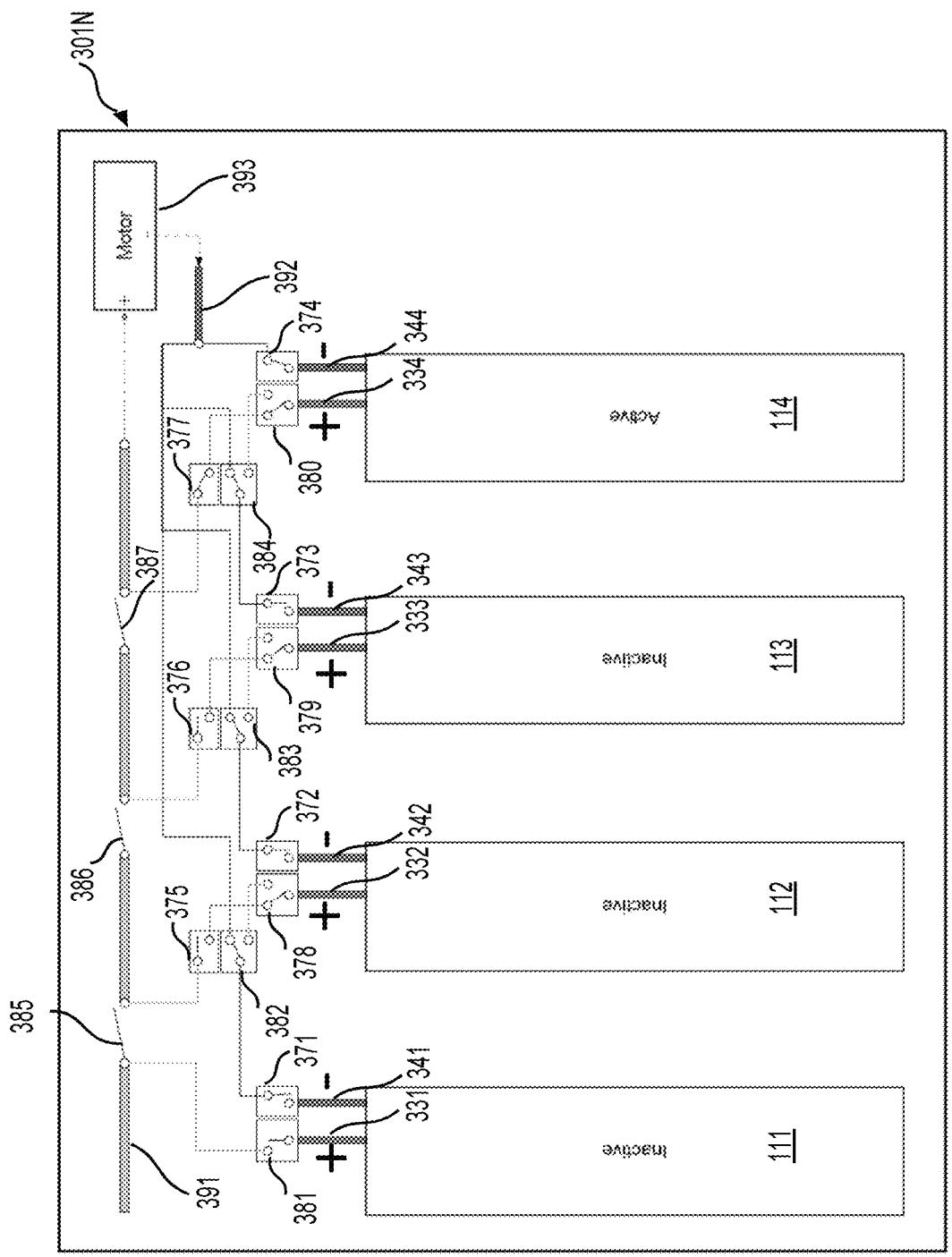
Figure 30:
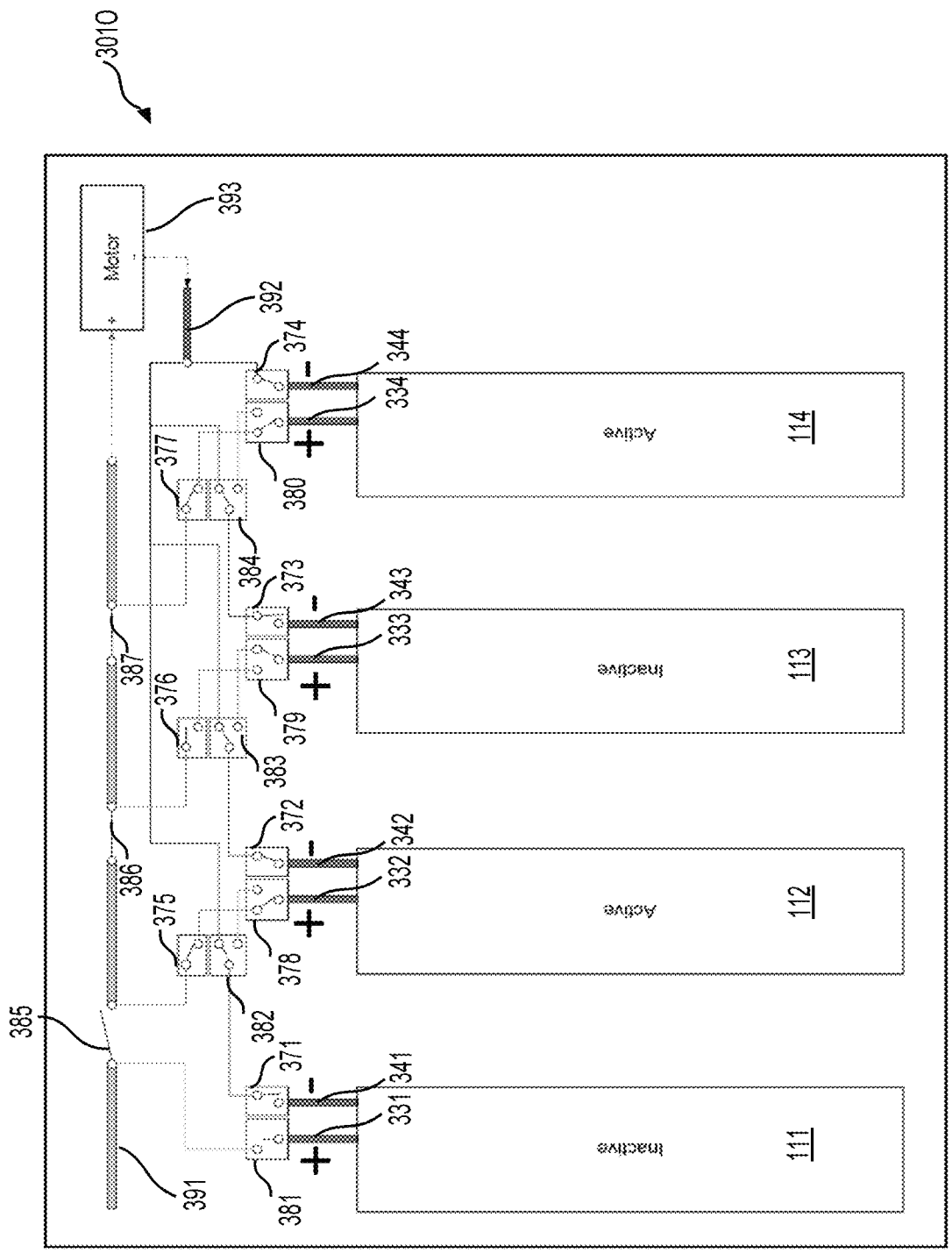

Referring to FIG. 3N, a circuit 301N includes the battery modules 111-114, the electric motor 393, and the HV module interconnect system 120. The battery modules 111-113 are disconnected from the battery module 114 and the electric motor 393. The battery modules 111-113 are also disconnected from each other. The battery module 114 can be connected to the electric motor 393. Accordingly, the battery modules 111-113 are inactive and the battery module 114 can be active.

Referring to FIG. 3O, a circuit 301O includes the battery modules 111-114, the electric motor 393, and the HV module interconnect system 120. The battery modules 111 and 113 are disconnected from the battery modules 112 and 114 and the electric motor 393. The battery modules 111 and 113 are also disconnected from each other. The battery modules 112 and 114 are connected in parallel, and then can be connected to the electric motor 393. Accordingly, the battery modules 111 and 113 are inactive and the battery modules 112 and 114 can be active.

Of course, different circuit configuration(s) can be configured for the battery pack 110, for example, by configuring the switches 371-387 differently. The battery pack 110 can also include less or more battery modules as those shown in FIGS. 3A-3O. The HV module interconnect system 120 can also include less or more switches and bus bars as those shown in FIGS. 3A-3O.

The positive terminal and negative terminal for each battery module can be standardized to facilitate replacement of the battery module. As described above, the positive and negative DC terminals can also be used in DC charging, such as during vehicle breaking, DC fast charging, or the like.

Figure 4:
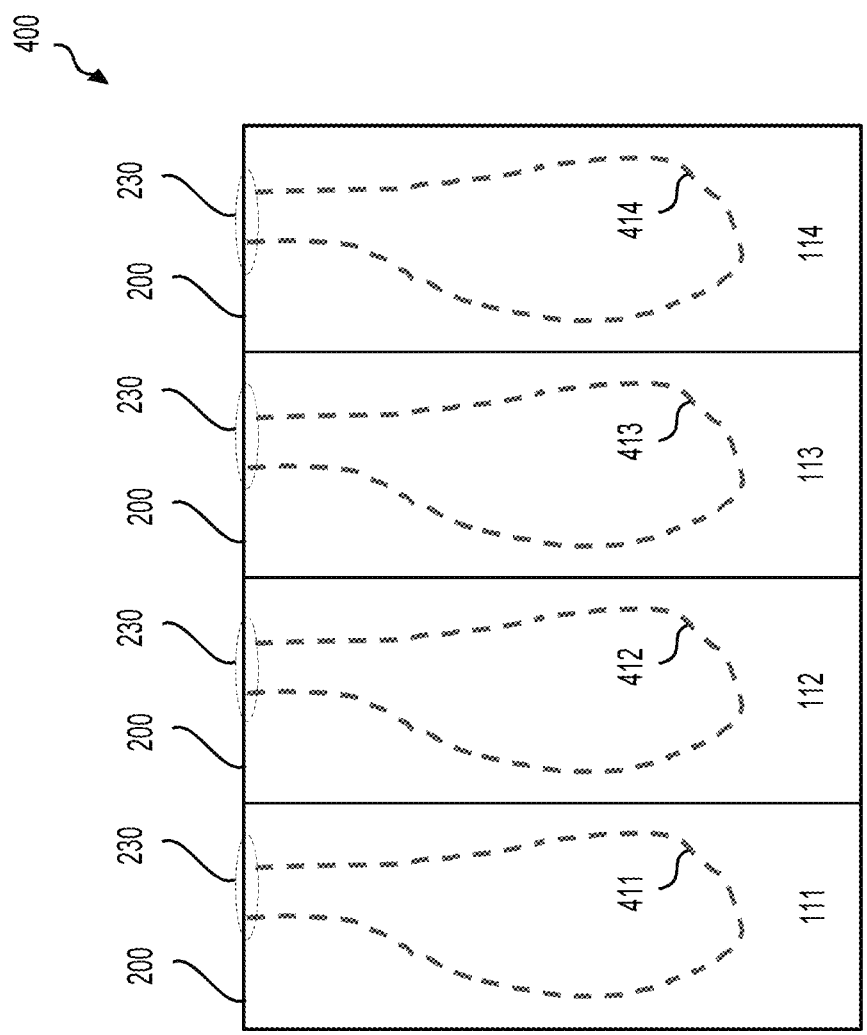
FIG. 4 shows an exemplary battery pack according to the present disclosure.

FIG. 4 shows an exemplary connection for portions of a cooling system 400 according to the present disclosure. The cooling system 400 can be used to cool the battery pack 110 during operation of the vehicle 100. The battery modules 111-114 include respective conduits 411-414 that are part of the cooling system 400. The cooling system 400 can include one or more pumps and additional conduits (not shown) to circulate a coolant. Each conduit can be connected to the cooling interface 230 of the interface 200 in the respective battery module 111-114. When one of the battery modules 111-114 is removed from the vehicle 100, remaining coolant in the battery module is sealed in the conduit without leakage. When the battery module is removed from the vehicle 100 to be charged externally, for example, at a charging station, the cooling interface 230 can be connected to an external cooling system (not shown) so as to maintain a suitable temperature for the battery module during charging.

Any suitable coolant can be used. The coolant can be liquid coolant, such as glycol or poly glycol. The coolant can also be a refrigerant that undergoes phase transitions from a liquid to a gas and back again repetitively. In some examples, air cooling can be used independently or in combination with the cooling system 400.

In the descriptions above with reference to FIGS. 1, 3A-3O, and 4, the battery modules 111-114 are located in the compartment 130. The compartment 130 includes a bottom plate, and the battery modules 111-114 can be individually accessed from underneath the vehicle 100 by opening the bottom plate or a portion of the bottom plate. The compartment 130 includes one or more side plates, and the battery modules 111-114 can be individually accessed from the left side and/or the right side of the vehicle 100 by opening the one or more side plates or portion(s) of the one or more side plates. The HV module interconnect system 120 can be attached to the compartment 130. Portions, such as conduits connecting the battery modules, of the cooling system 400 can be located in the compartment 130.

The compartment 130 can be divided into smaller compartments or bays where each battery module is positioned in the respective bay. Each bay can be open or close individually and the respective battery module can be removed or installed accordingly. Referring to FIG. 1, the bays can be accessed from underneath the vehicle 100 or from the right side and/or the left side of the vehicle 100.

In general, battery modules in a battery pack can be arranged in any suitable configuration. The battery modules can be arranged in a row, as shown in FIGS. 1A-1B. The batter modules can be arranged in multiple rows and multiple columns on a single plane and can be accessed from underneath a vehicle. The battery modules can be arranged in multiple planes and can be accessed from a side of a vehicle. When a vehicle includes multiple battery packs, the battery packs can be positioned in a same location or different locations in the vehicle, and thus battery modules in the battery packs can be accessed from different positions of the vehicle. While a HV module interconnect system and a cooling system are adapted accordingly, each of the battery modules can include one or more standard charging sockets, a communication interface, a cooling interface that are similar to those described in FIG. 2. Of course, specific locations of the one or more standard charging sockets, the communication interface, the cooling interface can be suitably adapted based on specific arrangement of the battery modules within a battery pack.

Figure 5:
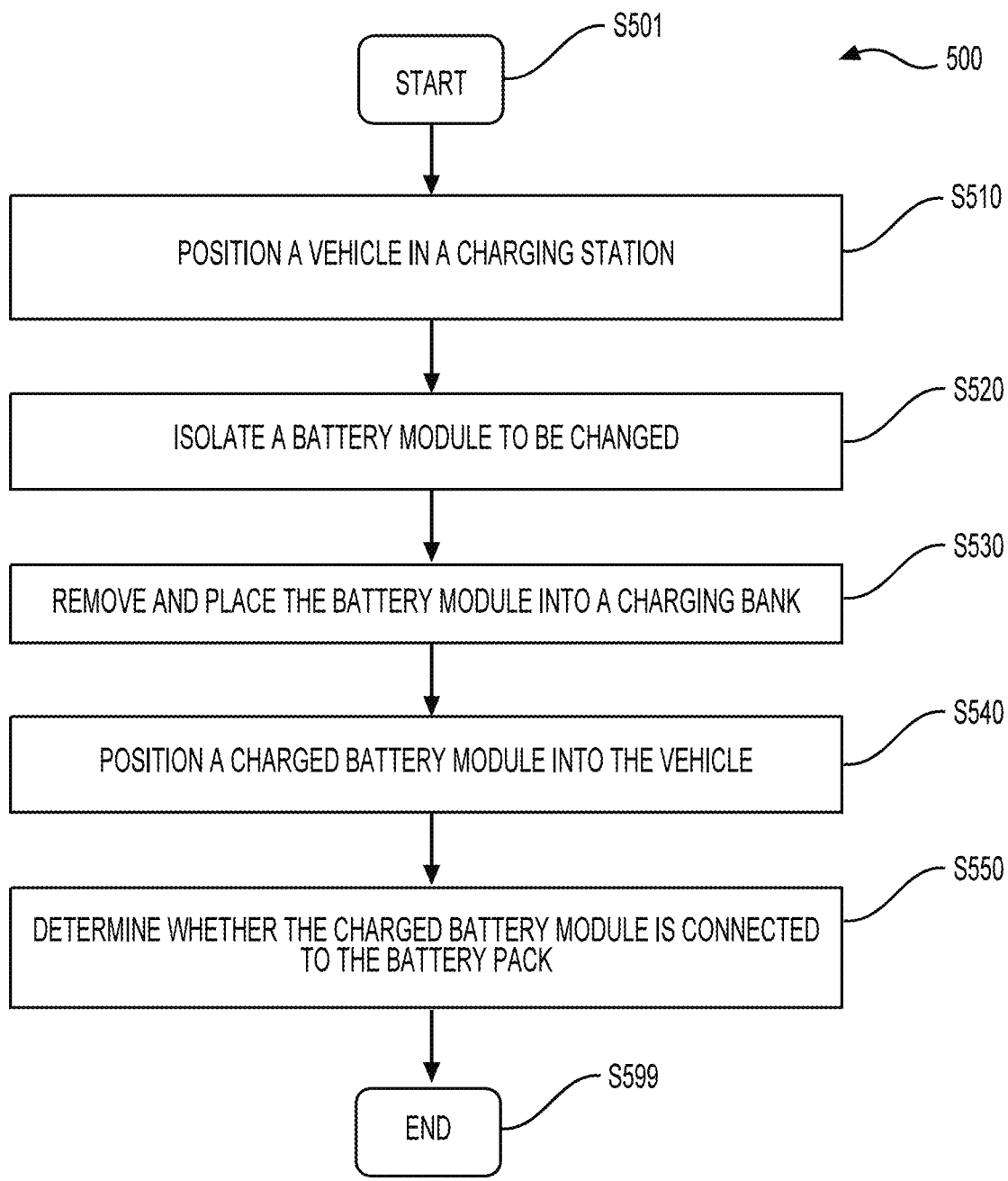
FIG. 5 is a flow chart illustrating a process 500 according to the present disclosure.

FIG. 5 is a flowchart outlining an exemplary process 500 according to the present disclosure. The process 500 can be used to change a battery module in a battery pack, such as one of the battery modules 111-114 in the battery pack 110. During operation of a vehicle, such as the vehicle 100, one or more of the battery modules 111-114 are determined to have a low battery level, and thus are determined to be depleted. The process 500 starts at S501 and proceeds to S510.

At S510, the vehicle, such as the vehicle 100, can be positioned in a charging station. By way of example, the battery module 112 is depleted and is to be replaced by a fully charged battery module. The vehicle 100 can be positioned by a driver or automatically. The battery module 112 can be accessed from the bottom side of the vehicle 100 by lifting the vehicle 100 to be above a certain height or by positioning the vehicle 100 above a recessed region. The compartment 130 or the bay where the battery module 112 is located can be opened from underneath the vehicle 100. The battery module 112 can then be released into a conveyor such as a conveyor belt, for example, in the recessed region. Alternatively, the battery module 112 can be accessed from the left side or the right side from the vehicle 100, and released into a conveyor that is on the left side or the right side of the vehicle 100.

At S520, the battery module to be replaced can be isolated. The battery module can be isolated by a robot, a replacement technician, or the like. The battery module can be accessed from any suitable positions in the vehicle, as described above with reference to S510. The battery module 112 can be electrically isolated as described with reference to FIGS. 3C-3D by controlling one or more switches, thus reducing a risk of exposing the replacement technician or the robot with a high voltage circuit. The battery pack 110 can also be isolated by activating the switches 354 and 364 when the compartment 130 is determined to be open.

At S530, the isolated battery module can be removed from the vehicle and placed into a charging bank. The isolated battery module 112 can be electrically disconnected from the HV module interconnect system 120 by disconnecting the positive and negative terminals 332 and 342 from the HV module interconnect system 120. The battery module 112 can be mechanically released from the compartment 130 or the bay and placed onto the conveyor in the charging station. The battery module 112 can be transferred to the charging bank via the conveyor. The battery module 112 can be electrically connected to a charging plug via the charging socket 210. As described above with reference to FIG. 2, the charging socket 210 can be a standard charging socket and is compatible with the charging plug at the charging station. Subsequently, the battery module 112 can be charged, for example, using AC or DC charging. The battery module 112 can be charged with or without cooling. In an example, the cooling interface 230 of the battery module 112 is mated with corresponding interface at the charging station, and the battery module 112 is charged with DC fast charging via the DC socket 213 while being cooled. The DC socket 213 can include the positive and negative terminals 332 and 342 in the battery module 112.

At S540, a charged battery module can be positioned into the vehicle. The charged battery module has an identical or compatible interface as that of the interface 200. For example, the charged battery module includes the charging socket 210, the communication interface 220, and the cooling interface 230. The charged battery module can be transferred from the charging station to the vehicle via the conveyor. Subsequently, the charged battery module can be positioned and fastened into the compartment or the bay. A positive terminal and a negative terminal of the charged battery module can be electrically connected to the HV module interconnect system 120, for example, via the first and second bus bars 321-322. In addition, the cooling interface of the charged battery module is connected with the cooling system 400 of the vehicle 100.

At S550, whether the charged battery module is connected to the battery pack can be determined, for example, by a sensor in the battery pack. When the charged battery module is determined to be connected to the battery pack, the communication interface 220 can send the confirmed status to the controller, such as an ECU, of the vehicle 100. The process 500 proceeds to S599, and terminates.

The process 500 can be suitably adapted. For example, certain step(s) can be omitted or combined. Additional step(s) can be added. A sequence that the steps S510-S550 are implemented can be adapted.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:
1. A battery pack, comprising:
 a first battery module and a second battery module, the first battery module including:
  a charging socket configured to charge the first battery module, the charging socket being conformed to a standard configuration;
  first terminals electrically coupled to the second battery module; and
  a cooling interface connected to a conduit in the first battery module to cool the first battery module; and
 a high voltage (HV) module interconnect system electrically connecting the first and second battery modules, the HV module interconnect system including one or more switches that are configured to electrically isolate the first battery module from the second battery module that is adjacent to the first battery module.

2. The battery pack of claim 1, wherein the cooling interface is conformed to a standard configuration.

3. The battery pack of claim 1, wherein:
the second battery module includes second terminals; and
the high voltage (HV) module interconnect system electrically connects the first and second battery modules via the first terminals and the second terminals, respectively.

4. The battery pack of claim 1, wherein the HV module interconnect system comprises one or more switches that are configured to electrically isolate the battery pack from an electric motor in a vehicle, the battery pack being included in the vehicle.

5. The battery pack of claim 1, wherein the first battery module is configured to be charged externally via the charging socket.

6. The battery pack of claim 1, wherein the first terminals are positive and negative direct current (DC) terminals configured to charge the first battery module via fast DC charging, the first terminals forming a DC socket that is included in the charging socket.

7. A battery module, comprising:
a charging socket configured to charge the battery module, the charging socket being conformed to a standard configuration;
terminals electrically coupled to another battery module; and
a cooling interface connected to a conduit in the battery module to cool the battery module, wherein
the battery module and the other battery module are electrically connected to a high voltage (HV) module interconnect system, and one or more switches in the HV module interconnect system are configured to electrically isolate the battery module from the other battery module that is adjacent to the battery module.

8. The battery module of claim 7, wherein the cooling interface is conformed to a standard configuration.

9. The battery module of claim 7, wherein
the other battery module includes second terminals; and
the battery module and the other battery module are electrically connected to the HV module interconnect system via the terminals and the second terminals, respectively.

10. The battery module of claim 7, wherein the battery module is configured to be charged externally via the charging socket.

11. The battery module of claim 7, wherein the terminals including positive and negative DC terminals configured to charge the battery module via fast DC charging, the terminals forming a DC socket that is included in the charging socket.

12. A method of replacing a battery module in a vehicle, comprising:
electrically isolating the battery module from a high voltage (HV) module interconnection system that connects the battery module in a battery pack and one or more other modules in the battery pack in the vehicle, the battery module including a charging socket configured to charge the battery module, the charging socket being conformed to a standard configuration, the one or more other modules in the battery pack being adjacent to the battery module;
removing the battery module from a compartment of the vehicle, the battery pack being positioned in the compartment; and
installing another battery module into the compartment.

13. The method of claim 12, further comprising:
after removing the battery module from the compartment, charging the battery module via the charging socket.

14. The method of claim 12, wherein
the HV module interconnection system includes one or more switches; and
isolating the battery module further includes activating the one or more switches to isolate the battery module from the HV module interconnection system.

15. The method of claim 12, further comprising:
electrically isolating the battery pack from an electric motor of the vehicle.

16. The method of claim 12, further comprising:
positioning the vehicle in a charging station prior to electrically isolating the battery module from the HV module interconnection system; and
after removing the battery module from the compartment of the vehicle, placing the battery module into a charging bank in the charging station.

17. The method of claim 12, further comprising:
determining whether the other battery module is connected to the battery pack.

18. The method of claim 13, wherein charging the battery module comprises charging the battery module via a DC socket in the charging socket using fast DC charging, the DC socket including positive and negative DC terminals.

* * * * *